United States Patent
Hartmann et al.

(10) Patent No.: US 12,055,417 B2
(45) Date of Patent: Aug. 6, 2024

(54) SYSTEM FOR MONITORING AN ENVIRONMENT

(71) Applicant: EUPRY, Copenhagen Nv (DK)

(72) Inventors: Adam Hartmann, Copenhagen Nv (DK); Jakob Konradsen, Copenhagen Nv (DK); Sigurd Jervelund Hansen, Copenhagen Nv (DK); Noam Groot Ritov, Copenhagen Nv (DK); Christian Herschend Jacobsen, Copenhagen Nv (DK)

(73) Assignee: EUPRY, Kobenhavn NV (DK)

( * ) Notice: Subject to any disclaimer, the term of this patent is extended or adjusted under 35 U.S.C. 154(b) by 0 days.

(21) Appl. No.: 17/056,859

(22) PCT Filed: May 22, 2019

(86) PCT No.: PCT/EP2019/063229
§ 371 (c)(1),
(2) Date: Nov. 19, 2020

(87) PCT Pub. No.: WO2019/224256
PCT Pub. Date: Nov. 28, 2019

(65) Prior Publication Data
US 2021/0207982 A1 Jul. 8, 2021

(30) Foreign Application Priority Data
May 22, 2018 (EP) .................................... 18173576

(51) Int. Cl.
*G01D 18/00* (2006.01)
*G01D 3/02* (2006.01)
(Continued)

(52) U.S. Cl.
CPC ............ *G01D 18/008* (2013.01); *G01D 3/022* (2013.01); *G01K 1/024* (2013.01); *G01K 15/005* (2013.01)

(58) Field of Classification Search
CPC ..................................................... G01K 15/005
See application file for complete search history.

(56) References Cited

U.S. PATENT DOCUMENTS

| 2005/0033540 A1 | 2/2005 | Bathurst et al. |
| 2006/0213766 A1* | 9/2006 | You ........................... C25C 7/06 |
| | | 204/228.1 |

(Continued)

FOREIGN PATENT DOCUMENTS

| CN | 102374875 A | 3/2012 |
| CN | 102916810 A | 2/2013 |

(Continued)

OTHER PUBLICATIONS

Tempretriever—Low cost reusable temperature data logger. 6 Warner Road—Warner, NH 03278; 2 pages; Aug. 2017.
(Continued)

*Primary Examiner* — Lisa M Caputo
*Assistant Examiner* — Cynthia L Davis
(74) *Attorney, Agent, or Firm* — Dinsmore & Shohl LLP

(57) ABSTRACT

A sensor unit is connectable to a gateway, and configured for measuring at least one environmental parameter, and configured to be calibratable relative to said environmental parameter(s), and further configured for storing electronic information associated with a validated calibration status and a unique identity of the sensor unit. The validated calibration status is a calibration certificate, the authenticity and authorship of the calibration certificate is verifiable, and the sensor unit is configured for being mechanically and/or electrically detachably attached to the gateway.

26 Claims, 8 Drawing Sheets

(51) Int. Cl.
*G01K 1/024* (2021.01)
*G01K 15/00* (2006.01)

(56) References Cited

U.S. PATENT DOCUMENTS

| | | | |
|---|---|---|---|
| 2008/0004798 A1 | 1/2008 | Troxler et al. | |
| 2013/0218502 A1* | 8/2013 | Artiuch | G01L 27/005 |
| | | | 702/98 |
| 2014/0200840 A1 | 7/2014 | Cox et al. | |
| 2014/0269812 A1 | 9/2014 | Deutscher et al. | |
| 2015/0184997 A1* | 7/2015 | Campbell | G01S 17/46 |
| | | | 250/349 |
| 2015/0347607 A1* | 12/2015 | Gredegard | G01D 18/008 |
| | | | 707/758 |
| 2017/0299413 A1* | 10/2017 | Keech | G01D 18/002 |
| 2017/0328791 A1* | 11/2017 | Schechter | G01K 15/007 |
| 2018/0026799 A1* | 1/2018 | Pottier | H04L 9/30 |
| | | | 713/156 |
| 2018/0045585 A1* | 2/2018 | Keith | G01K 1/08 |
| 2018/0120169 A1 | 5/2018 | Jackson et al. | |
| 2019/0349204 A1* | 11/2019 | Enke | G06F 21/602 |

FOREIGN PATENT DOCUMENTS

| | | | | |
|---|---|---|---|---|
| CN | 103323045 A | | 9/2013 | |
| CN | 105228157 A | | 1/2016 | |
| CN | 107743631 A | | 2/2018 | |
| DE | 102010062657 A | | 6/2012 | |
| DE | 102012112427 A1 | * | 6/2014 | ......... G05B 19/0423 |
| GB | 2284059 A | * | 5/1995 | ............ G01D 3/022 |
| JP | 2003524948 A | | 8/2003 | |
| JP | 2006085430 A | | 3/2006 | |
| JP | 2007248277 A | | 9/2007 | |
| JP | 2010055643 A | | 3/2010 | |
| JP | 5066165 B2 | | 11/2012 | |
| JP | 2017167999 A | | 9/2017 | |
| WO | 2016094946 A1 | | 6/2016 | |

OTHER PUBLICATIONS

Metrologie fur die Digitalisierung von Wirtschaft und Gesellschaft, XP055605393, DOI: 10.7795/310.20170499; 113 pages; Dec. 2017.
PTB-Mitteilungen 127, (2017), Heft-4; Siegfried Hackel et al.; "The Digital Calibration Certificate"; pp. 75-81; Metrology For The Digitalization of the Economy and Society.
Office Action Issued in Corresponding Japanese Application No. 2021-515279 Mailed Jan. 31, 2023, 6 pages.

* cited by examiner

SYSTEM FOR MONITORING AN ENVIRONMENT

CROSS-REFERENCE TO RELATED APPLICATIONS

This application is the U.S. national stage of PCT/EP2019/063229 filed May 22, 2019, which claims priority of European patent application 18173576.2 filed May 22, 2018, both of which are hereby incorporated by reference in their entirety.

FIELD OF INVENTION

The present invention relates to a sensor unit, a gateway system, an environmental surveillance system, and a method for calibrating multiple temperature sensor units.

BACKGROUND OF INVENTION

The monitoring of environment conditions, such as the temperature, humidity (water vapor content), and the concentration of other species, is essential in industries involving sensitive materials such as medical and food products. For example the monitoring of the environment is essential in storage facilities in hospitals, laboratories, and pharmacies, as well as sites for food storage and food processing. Possible storage facilities include temperature monitoring refrigerators, freezer rooms, freezers, deep freezers, climate and growth cabinets, as well as pharmaceuticals and biological substances under transport.

The monitoring may be a requirement for regulatory compliance, for example to ensure a certain product quality, and may further minimise the amount of wasted products that must be discarded due to quality or regulations.

The known techniques for environment monitoring includes manual hand written logging, USB logging, and automated logging systems connected via the internet.

For example, WO 2016/162545 [1] discloses a system for monitoring e.g. temperatures. The system comprises fixed sensors, transmitting data to a hub configured to receive and store the data from the sensor. The system further comprises handheld sensors, comprising detachable temperature probes and transmitting means for transmitting the data to the hub. The sensors may both transmit the measured data as well as the sensor type (or ID) to the hub. Thus, the sensor may indicate whether the transmitted data are e.g. temperature or humidity measurements. The data from the hub may be further automatically transmitted from the hub to a cloud using the internet, thus enabling automated and secure logging.

The sensors of the system in [1] are factory calibrated, and the calibration state, or the deviation from the factory calibration, may be tested in the system by a method including measurements in boiling water. The sensor must have the required calibration state in order to keep assurance of measurements validity, and thus to provide reliable and compliant data.

US 2014/0200840 [2] discloses a system for measuring a parameter, such as temperature, by a sensor, where the sensor may be calibrated by using the system, and where the risk of using an out-of calibration sensor is reduced. In the system of [2] the sensor is e.g. wireless connected to a portable device, thus corresponding to a hub, where the portable device may be further connected to a cloud-based server. The measured parameter data from the sensors may be stored either in the sensor itself, on the portable device, or in the cloud, and data may be transmitted between the units either continuously or periodically.

The portable device or the cloud server of [2] further contains a calibration routine for calibrating the sensor. The calibration procedure may include exposing the sensor to a known calibration medium, retrieving an un-calibrated value from the sensor and determine if it is within a predetermined range and/or stability. The result of the calibration, as well as the date of calibration, may be stored. Thus, the system contains data serving as proof of that the sensor was calibrated according to certain standards. The measured and stored parameter data in [2] may be appended calibration information. The calibration information can be in the form of values and/or time elapsed since last calibration, and thus proof of the calibration. Alarms and warnings may be triggered if the measured value is outside a predetermined acceptable range, or if the elapsed time has exceeded a predetermined value, where the predetermined range and value optionally is variable.

Despite the advances within the field of monitoring systems, the systems suffer from the drawback of complex maintenance routines, including complex calibration routines.

Furthermore, when the sensor becomes inoperable, e.g. by exceeding the date of calibration, and needs re-calibration, the entire sensor must be replaced and/or re-calibrated. Thus, the conventional monitoring systems include considerable and repeated hardware investments. There is therefore a need for more simple and more reliable monitoring systems.

Furthermore, even though the systems comprise calibration information, the user of the sensor has limited possibilities of verifying the calibration data, and e.g. ensuring that the calibration procedure was carried out according to a desired standard, or e.g. ensuring that the calibration data have not been altered subsequent to the calibration. Such verification will not be immediately accessible for the user.

For particularly medical and food products, there is an increasing focus on reducing the risk of fake, tampered, or degraded products getting into the supply chain, including products, which have degraded due to erroneous storage conditions. Thus, the regulatory requirements for the monitoring systems are increasing, and there is therefore a need for more simple and reliable monitoring systems.

SUMMARY OF INVENTION

The present invention provides a simpler and more efficient way of coupling sensors with their calibration information, thus facilitating a reduced complexity of the sensor and sensor data supply chain, as well as reduced risk of errors in said supply chain during handling and maintenance. The present invention further provides a simple and immediately accessible way of verifying, or validating, the calibration information. The calibration information may be in the form of actual calibration data, and/or in the form of a calibration certificate. Preferably, the verification is immediately readable by a human, e.g. in the form of a calibration certificate, which advantageously is an electronic document, such as a pdf file.

The present invention further provides a simpler and more efficient method of calibrating a sensor unit.

The present invention further provides a simpler and more efficient sensor unit, gateway system, and environmental surveillance system, where the maintenance requirements, data credibility or data integrity, as well as the operational efficiency are improved.

The present invention also provides a sensor unit, gateway system, and environmental surveillance system, where the risk of using an uncalibrated or unspecified calibrated sensor is reduced, and where the risk of tampered data is reduced, including reduced risk of tampered calibration status, and tampered sensor data.

A first aspect of the invention relates to a sensor unit connectable to a gateway, and configured for measuring at least one environmental parameter, and configured to be calibratable relative to said environmental parameter(s), and further configured for storing electronic information associated with a validated calibration status and a unique identity of the sensor unit.

In a preferred embodiment, the validated calibration status is a validated traceable calibration status.

In a further or another preferred embodiment, the sensor unit is configured for storing electronic information associated with the validated calibration status and the calibration history.

A second aspect of the invention relates to a gateway system for monitoring an environment with respect to at least one environmental parameter, the system comprising:
  at least one calibratable sensor unit configured for measuring at least one environmental parameter, said sensor unit having a unique identity and a validated calibration status associated with electronic information stored thereon,
  at least one power unit connectable with the sensor unit(s) and configured for receiving, storing, and optionally further transmitting, information pertaining to the unique identity, the validated calibration status, and said environmental parameter(s) from said sensor unit.

In a preferred embodiment, the gateway system comprises a sensor unit according to the first aspect of the invention.

A third aspect of the invention relates to an environmental surveillance system comprising a plurality of networked gateway systems according to the second aspect of the invention, wherein each of the gateway systems are configured to transmit information pertaining to the unique identity, the validated calibration status, and environmental parameter(s) from each sensor unit connected to said gateway system, and wherein the environmental surveillance system is configured to receive said information via said network, process said information in order to detect an outlier and store the unique identity, the calibration state and said environmental parameter(s) from each sensor unit.

A fourth aspect of the invention relates to a method for calibrating multiple temperature sensor units in a liquid, comprising the steps of:
  providing multiple temperature sensor units, such as at least 50 sensor units, wherein each sensor unit is configured for measuring temperature,
  mounting the multiple temperature sensor units on a rack,
  arranging the rack with the temperature sensor units in a liquid,
  performing a calibration routine such that each temperature sensor units is calibrated relative to the temperature of the liquid,
  optionally storing a calibration state on each temperature sensor unit and associating each temperature sensor unit with a unique identity.

In a preferred embodiment, the method is for the sensor unit according to the first aspect of the invention.

DESCRIPTION OF DRAWINGS

The invention will in the following be described in greater detail with reference to the accompanying drawings.

FIG. 4D shows an embodiment of an environment, exemplified as a fridge, to be monitored. The connected sensor unit and gateway are placed in the environment, and the uniquely identifiable measurements, and associated calibration status, is transmitted wirelessly to a remote unit 6;

DETAILED DESCRIPTION OF THE INVENTION

Figure 1:
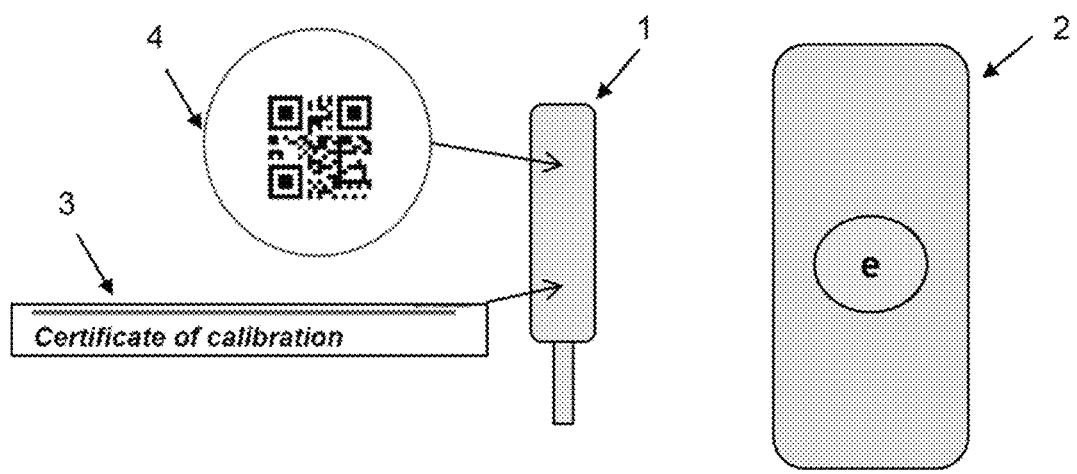
FIG. 1 is a schematic showing an embodiment of a sensor unit 1 and a gateway 2 according to the present disclosure, where the sensor unit is configured for storing electronic information 3 associated with the validated calibration status, exemplified as a calibration certificate, and where the sensor unit in addition further comprises a unique identity, exemplified as a unique identity visible for human interaction, such as a GS1 datamatrix 4.

The invention is described below with the help of the accompanying figures. It would be appreciated by the people skilled in the art that the same feature or component of the device is referred to with the same reference numeral in different figures. A list of the reference numbers can be found at the end of the detailed description section.

The requirements for environmental monitoring are increasing in many industries, partly due to the wish of improving product quality and production efficiency, and partly due to regulatory compliance requirements.

Examples of environmental parameters relevant to be monitored includes: temperature, pressure, pH, humidity, $CO_2$, $O_2$, acceleration, sound, light, GPS, and particulate matter.

An environmental parameter is measured by use of a sensor. A sensor may be configured for measuring one or more parameters, e.g. by human physical interaction with the device through a button. Alternatively, multiple sensor units configured for measuring different parameters may be used to monitor multiple environmental parameters.

Sensor Unit

A sensor, such as for example a temperature sensor, typically operates by producing an analogue signal in response to the environmental condition, such as the temperature of the environment around the sensor. The analog signal may be conditioned to minimise noise and amplify the signal, and is further typically converted to a digital signal. Thus, a sensor, or a sensor unit, typically at least further comprises an analog-digital converter.

To obtain precise and reliable measurements from a sensor, it is essential that the sensor unit is calibrated. Calibration typically requires placing the electrically connected sensor in surroundings with variable environmental parameters, such as solutions of known temperature or known concentrations, providing one or several measurement points, thereby establishing the relationship between the analog or digital signal and the environmental parameter. The established relationship may also be referred to as the calibration values.

The calibration routine, particularly the parts including calculation of calibration variables and documentation (signatures, paper handling, producing of certificates and handling of calibration units), is conventionally carried out on a single sensor device at a time, and is therefore a time consuming and inefficient process. In addition, since the calibration is carried out as a separate and isolated procedure from the sensor measurements, the calibration values and the calibration procedure applied are typically written separately from the sensor unit and the measurement data. Thus, secure direct and unambiguous traceability between the sensor measurements, i.e. the raw measurement data, and the associated calibration values, does not exist. The correlation, or traceability, is normally confirmed via calibration certificates, and the calibration certificates are further typically not stored on the sensor unit itself. Thus, there is a risk of errors, and the process includes additional handling time, supply chain complexity, and documentation management for the end user.

In the present disclosure, it was found that secure and automatic correlation, or traceability, between the raw measurement data and the calibration values may be obtained by adapting the sensor unit to store the electronic information associated with the calibration, and further adapting the sensor unit to store an electronic unique identity. Thus, the measurements obtained by the uniquely identifiable sensor unit may be directly and unambiguously traceable to the calibration values, thereby providing more secure and reliable data. The traceable calibration data and variables reduces the risk of errors, handling time, reducing supply chain complexity and ease of use for end user in regards of documentation management.

Advantageously, the traceable calibration is based on a standard such as ISO17025, and further advantageously the calibration data stored on the sensor unit itself is in the form of a direct ISO 17025 conformable certificate, for example in pdf format or other directly retrievable format.

This further means that the risk of using an uncalibrated or unspecified calibrated sensor is avoided, and the risk of using tampered calibration values and/or tampered measurement data is also avoided. The sensor unit of the present disclosure further provides a direct and unambiguous documentation and substantiation of the calibration status.

Validated Calibration

It may be further advantageous that the electronic information associated with the calibration includes a validation, or verification, of the calibration information, where the calibration information may be in the form of actual calibration data and/or in the form of a calibration certificate. By validated calibration information is meant calibration information, which is adapted to be in such a form that it can be ensured that the information is authentic, and that the data has not been tampered subsequent to the calibration procedure, e.g. by a non-authorized person. Thus, a validated calibration ensures that the calibration information is authentic and that the authorship of the information is verified, and that the data has not been tampered subsequent to the calibration procedure. Thus, a validated calibration as electronic information may be compared to a paper-based validation, where the paper document with the calibration data is signed and notarized by a certified auditor, e.g. by a seal or fingerprint.

For a physical document, which has been signed and notarized, subsequent alterations or tampering with the data or signature, may be easily visually detected. In a similar manner, a validated calibration includes an "electronic fingerprint" which ensures that the data or signature has not been tampered with. Electronic fingerprints are known from technologies such as digital signature and public key cryptography, as further described below.

Thus, by the term validated calibration is meant that the data which corresponds to the calibration information (either in the form of actual calibration data and/or in the form of a calibration certificate) can be cryptographically validated. This means that the authenticity of the calibration information can be verified to not have been altered since the production or generation from the calibration laboratory.

The validation may be obtained through the storing of the original calibration information (data or certificate), and an encrypted fingerprint on the sensor unit. A process for generating such an encrypted fingerprint may include cryptographic hash function, or "hashing" as exemplified in FIG. 8. By the term "hash function" or "hashing" is meant a mathematical algorithm that maps data of arbitrary size to a bit string of a fixed size (a hash), and which is designed to be a one-way function, that is, a function which is infeasible to invert. The irreversibility of hashing implies that the input data cannot be tampered with based on the output data. Thus, the generated electronic fingerprint stored on the sensor (i.e. the output) is unique for the actual calibration data (i.e. the input data), and this secures the authenticity and/or authorship of the calibration data (i.e. the input). Thus, the fingerprint enables a secure validation of the calibration data/certificate on the sensor plug.

Figure 8:
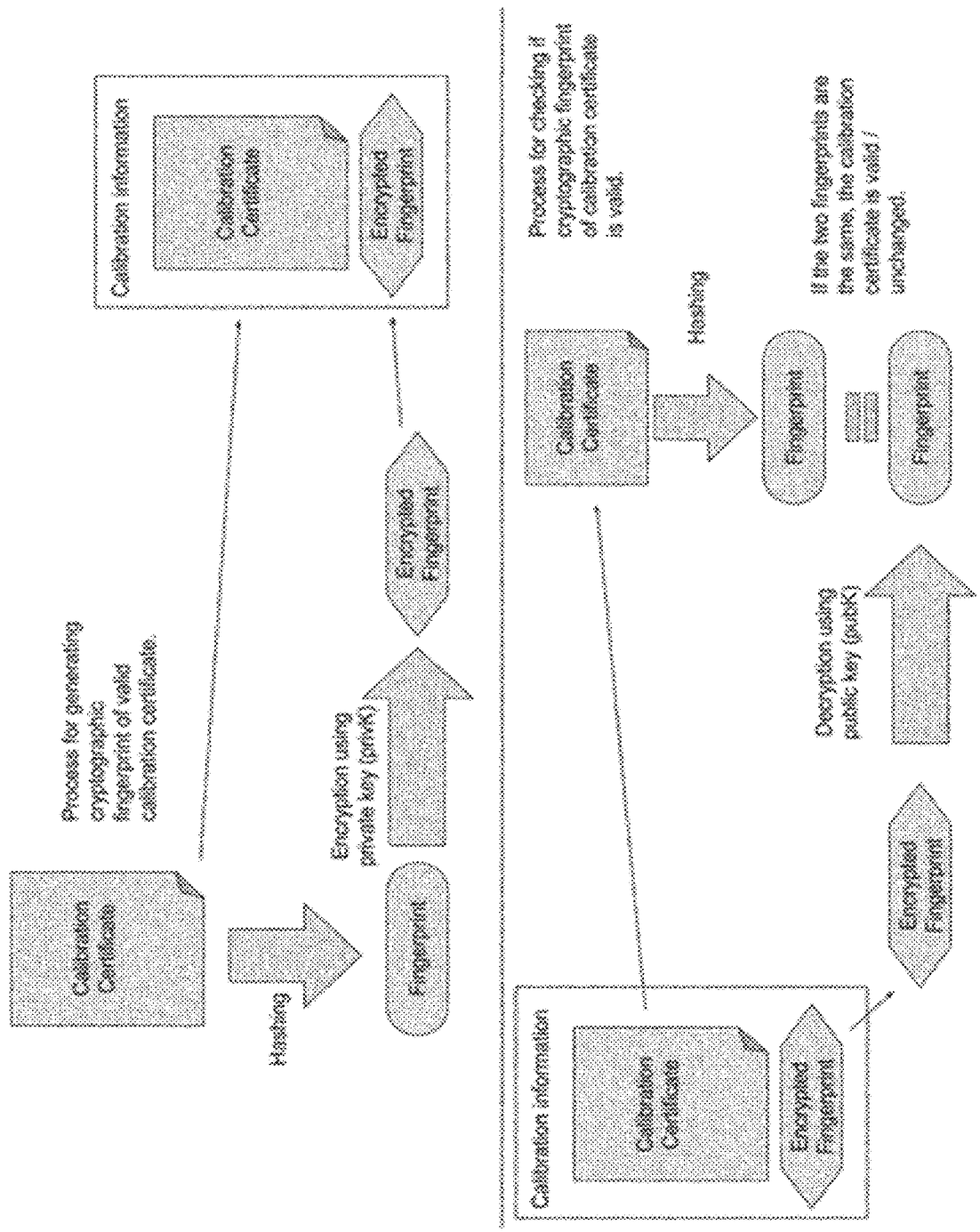
FIG. 8 is a schematic showing an embodiment of the generation and retrieval of a cryptographic fingerprint, such as a fingerprint of a calibration certificate, according to the present disclosure.

The process is further exemplified in the upper part of FIG. 8. The calibration data/certificate is first generated during the calibration procedure. Advantageously, the calibration is carried out in accordance with certain standards, for example ISO 17025. Further advantageously, the certificate may be a pdf file which is human readable, and/or machine encoded information.

A hashing function is then used to generate a fingerprint of the calibration data, or the data that the calibration certificate consists of. This means that the fingerprint is unique to the data, e.g. the data that the calibration certificate consists of. Advantageously, the fingerprint is then encrypted using a private key, which means a key only known by the authorized calibrator.

When a user subsequently wants to verify the authenticity of the calibration data/certificate, the process is exemplified in the lower part of FIG. 8. The encrypted fingerprint can be decrypted using a public key, which means a key known by the users who need to authenticate the certificate. The decrypted fingerprint is then compared to the fingerprint generated by hashing the available calibration certificate, and if the two are the same, the calibration certificate is deemed valid. Thus, there is no risk involved in distributing the public key.

Figure 9:
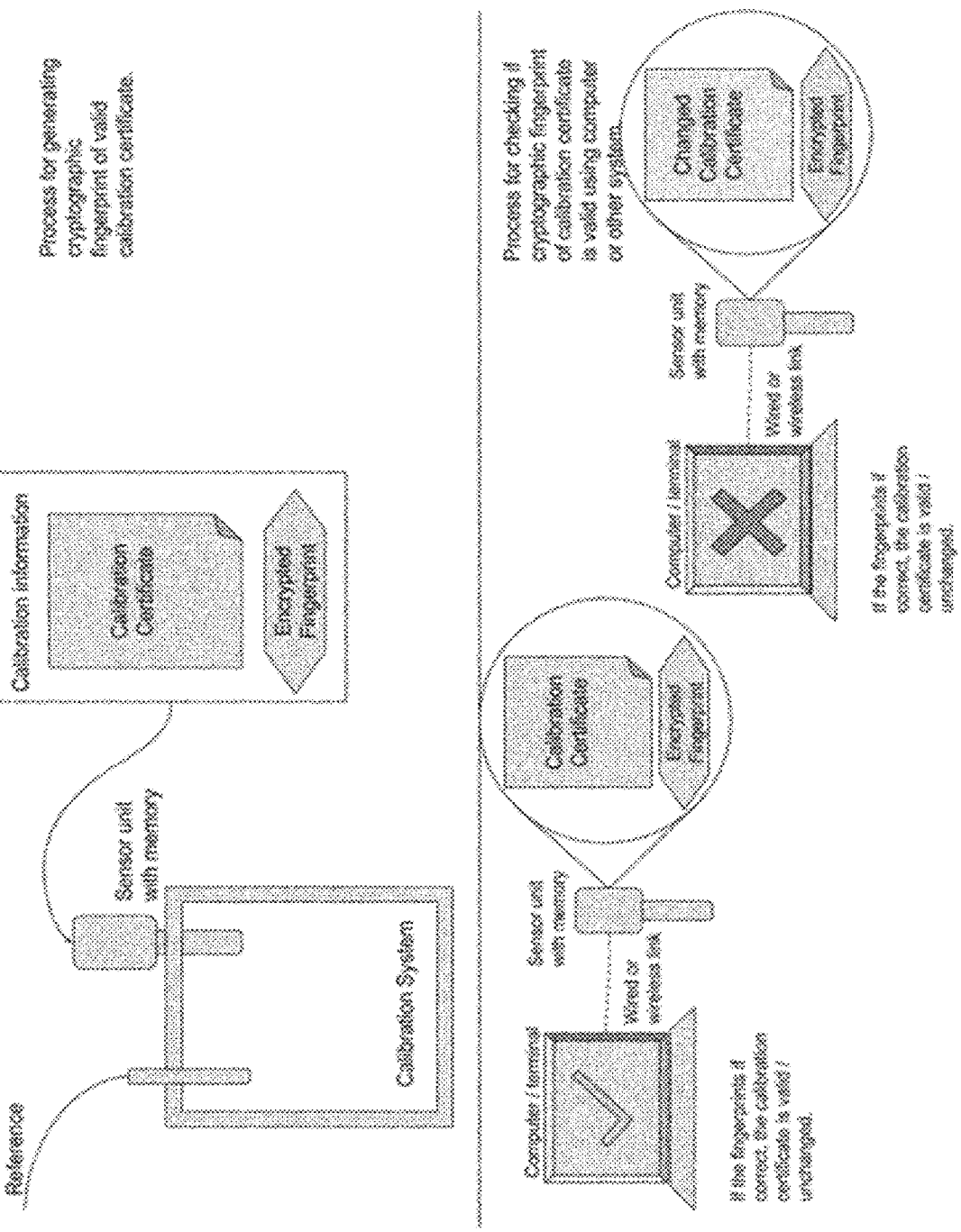
FIG. 9 is a schematic showing an embodiment of the generation and use of a cryptographic fingerprint, such as a fingerprint of a calibration certificate, according to the present disclosure.

The process is further exemplified in FIG. 9. In the upper part of FIG. 9, the sensor unit is first calibrated. Advantageously, it is calibrated against a traceable standard, and the calibration data is generated by the calibration system in the form of a certificate or another format, e.g. data. The calibration data/certificate is subsequently stored on the sensor unit memory together with the encrypted fingerprint.

When a user subsequently wants to verify or validate the authenticity of the calibration data or certificate, this can be done on a computer or in the gateway, as exemplified in the lower part of FIG. 9. This way, the user ensures that the data is valid and unedited.

With the encrypted fingerprint, and the matching public encryption key, it is possible to verify or validate the authenticity of the calibration information e.g. the certificate. This is done with the fingerprint and the calibration information e.g. certificate, which after hashing can be compared. If the two are the same, the calibration information (e.g. the certificate, can be deemed authentic.

This approach is similar to digitally signing documents in other domains such as pdf files or verified mail. The process of using hash functions, private and public keys ensures the authenticity or proof that the original data was not changed. Because the hash used is a one-way function, it cannot be reversed trivially, making it very difficult (e.g. requiring several years of computation) to create a certificate or associated fingerprints that would falsely be accepted as valid or unchanged.

Thus, by use of validation, e.g. in the form of an encrypted fingerprint, it is not possible for a person to alter or falsify the calibration data/certificate, based on the calibration data/certificate present on the sensor plug.

In an embodiment of the disclosure, the validated calibration status is an encrypted fingerprint, optionally a fingerprint a obtained by a hashing function.

The validated calibration provides both improved reliability of the monitoring system, as well as improved flexibility of the system. For example, the calibration data/certificate will be directly physically associated with the sensor unit. This means that the calibration procedure may be carried out by any certified laboratory and is not restricted to a certain supplier. Furthermore, the calibration data/certificate is easily and flexibly accessible without further requirements e.g. internet access, since the user does not need to retrieve the information from the supplier, e.g. the central server of the supplier.

Calibration Certificate

The calibration information may be in the form of actual calibration data, and/or in the form of a calibration certificate. To improve the accessibility, it is advantageous that the calibration information, especially the validated calibration information, is immediately readable by a human, e.g. in the form of a calibration certificate, which may be an electronic document, such as a pdf file.

Thus by the term "calibration certificate" is meant a human readable certificate of calibration, which serves as proof that a device was calibrated against a reference and possibly is calibrated in accordance with an international accepted standard, e.g. ISO17025 or other. Examples of human readable certificate formats include pdf format, csv format, xml format or any other user readable formats.

Advantageously, the calibration status is a validated status. By the term validated calibration status is also meant that the calibration values are certified to be within an approved range, by using an approved calibration routine, such as an internationally approved standard. This way, the calibration of the sensor unit may be ensured to comply with regulatory requirements.

Further, for easy and reliable verification of the calibration status, the electronic information associated with the validated calibration status advantageously comprises a calibration certificate, such as a certificate verifying that the validated calibration status complies with ISO 17025, or is accredited to ISO 17025, and/or accredited by the corresponding NIST and/or ILAC.

In an embodiment of the disclosure, the validated calibration status is a calibration certificate. In a further embodiment, the validated calibration status is validated according to ISO 17025, or accredited to ISO 17025, and/or accredited by the corresponding NIST and/or ILAC.

In a further embodiment, the validated calibration status is in the format of a directly conformable certificate, such as a directly retrievable pdf format.

Traceable

The present disclosure facilitates the advantage that the measurements obtained by the actual sensor unit, which may be an uniquely identifiable sensor unit, may be directly and unambiguously traceable to the calibration values, thereby providing more secure and reliable data. Further advantageously, the sensor unit may be configured for traceably storing the entire calibration history, i.e. traceable informations related to all calibrations carried out over the lifespan of the sensor unit.

In a preferred embodiment, the validated calibration status is a validated traceable calibration status.

In a further or another preferred embodiment, the sensor unit is configured for storing electronic information associated with the validated calibration status and the calibration history.

Further advantageously, the calibration information is directly traceable to an accredited calibration facility. This means that the calibration information (e.g. data or certificate) traceably refers to a calibration that was performed with reference or traceability to the internationally approved standards of units SI. In other words that the reference or references used for the calibration have been calibrated traceable in some form via different calibration laboratories to the international standard. The traceability is ensured via the use of a known laboratory with a known reference, which can be identified by a deceleration of laboratory and a calibration certificate of calibration for the reference that the calibration laboratory uses.

Unique Identity

To further obtain direct and unambiguous traceability between a sensor unit and the measurements of the sensor, the sensor unit advantageously comprises electronic information uniquely identifying the sensor. Thus, the recorded calibration data as well as the recorded measurements may directly and unambiguously refer to the unique identity, irrespective of the parameter data being stored on the sensor itself, or on a remote unit.

Advantageously, the electronic unique identity is fixed invariably to the sensor unit, e.g. as a hardware encoded identification for machines, such as a silicon serial number, thereby securing direct traceability between the measurements, and the sensor unit and the validated calibration.

In an embodiment of the disclosure, the unique identity of the sensor unit is a hardware encoded identification for machines, such as a silicon serial number.

For production control and for easy handling and tracking of the sensor unit, the sensor unit advantageously further comprises one or more unique identity visible for the human eye and for human interaction. For example a sensor unit may be labeled with a name, a bar code, or a GS1 datamatrix.

In an embodiment of the disclosure, the sensor unit comprises one or more unique identity of the sensor unit visible for human interaction, e.g. by radio frequency ID (RFID), such as a readable name, label, bar code, and/or GS1 datamatrix, such as a GS1 GRAI code.

FIG. 1 shows an embodiment of a sensor unit 1 according to the present disclosure, where the sensor unit is configured for storing electronic information 3 associated with the validated calibration status, exemplified as a calibration certificate, and where the sensor unit in addition further comprises a unique identity, exemplified as a unique identity visible for human interaction, such as a GS1 datamatrix 4.

Figure 3:
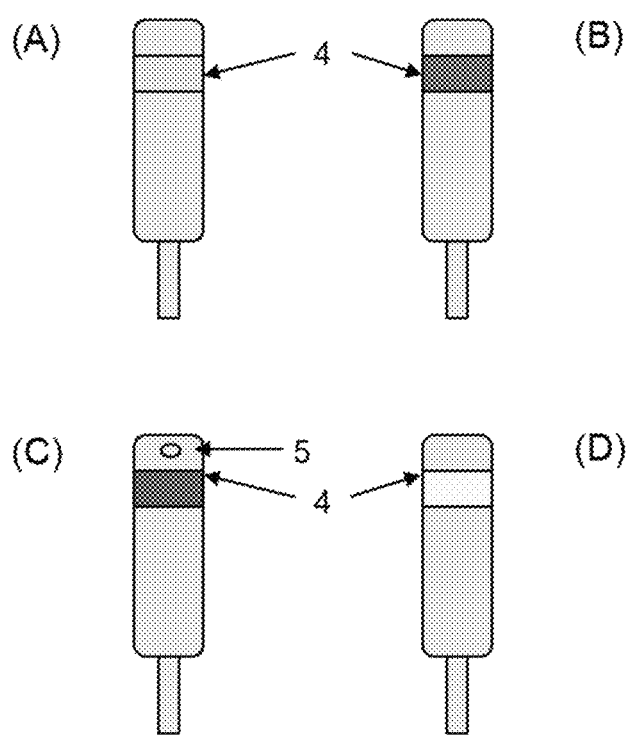
FIGS. 3A-D are schematics showing embodiments of sensor units according to the present disclosure having different visible unique identities 4, embodied as labels with different colours. For example the label of (A) identifies the sensor unit as a humidity sensor, the label of (B) refers to a temperature sensor, the label of (D) refers to a light sensor, and the label of (C) refers to an alert unit. The sensor unit of (C) further comprises a visible indicator unit 5 alerting by light and/or sound.

FIG. 3 shows embodiments of sensor units having different visible unique identities 4, embodied as labels with different colours. For example the label of (A) identifies the sensor unit as a humidity sensor, the label of (B) refers to a temperature sensor, the label of (D) refers to a light sensor, and the label of (C) refers to an alert unit.

Advantageously, the unique identity is an ID IC. By the term "ID IC" is meant a unique identity based on the use of non-editable/non-programmable identification circuitry, which ensures that the identification of the sensor unit can not easily be disputed. Thus, ID IC may be considered as a unique identity number/name, corresponding to a frame number on a bike or a chassis number on a car. Examples of technical implementations of ID IC include identity based on read only memory ICs with unique serial number, a silicon serial number, or internal read only memory in a microprocessor in a sensor unit. For example, the unique identity may be a silicon serial number physically associated with a chip.

Further advantageously, the unique identity or the ID IC may include hashing functions to further improve the reliability and reduce the risk of falsified calibration information and/or unique identity.

Measurements and Storage

A sensor configured for measuring one or more environmental parameters, may be further adapted to measure repeatedly at predetermined intervals. The measured parameter data may be stored directly on the sensor itself, and/or the data may be further transmitted, either continuously or periodically, to another unit. By periodically is meant that the parameter data are collected and stored on the sensor unit over a period of time, and then later transmitted as a collected data package to the other unit.

In an embodiment of the disclosure, the sensor unit is configured for storing electronic information associated with the measured parameter(s).

Simultaneously with the transmission of parameter data, the electronic information relating to the validated calibration status and the unique identity of the sensor unit may be transmitted to the other unit, thereby securing that the calibration status specific to the uniquely identified sensor unit is tagged to the measurements.

In the present disclosure it was found advantageous that the measured parameter data is stored in another unit, such as a gateway. A gateway is a unit, which is mechanically and electrically connectable to the sensor unit. The gateway is further advantageously configured for receiving, storing, and optionally further transmitting the electronic information of the sensor unit, e.g. to a remote unit.

In an embodiment of the disclosure, the sensor unit is mechanically and electrically detachably attached to the gateway. In a further embodiment, the gateway is configured for receiving, storing, and optionally further transmitting the electronic information of the sensor unit.

To improve the robustness of the connection and to minimize the risk of erroneous or insufficient mechanical and/or electrical connection between the sensor unit and the gateway, the gateway and/or sensor unit advantageously comprises one or more attachment indicator(s) to tell the user if the connection between the gateway and sensor unit has been successfully made, i.e. such that sufficient electrical connection and sufficient mechanical connection has been established. The attachment indicator is further described in the section related to the gateway below.

The gateway facilitates smaller electronic dimensioning of the sensor unit.

The sensor unit may be calibrated independently from the gateway. It is therefore advantageous that the sensor unit is detachably attached, or connected, to the gateway.

Figure 2:
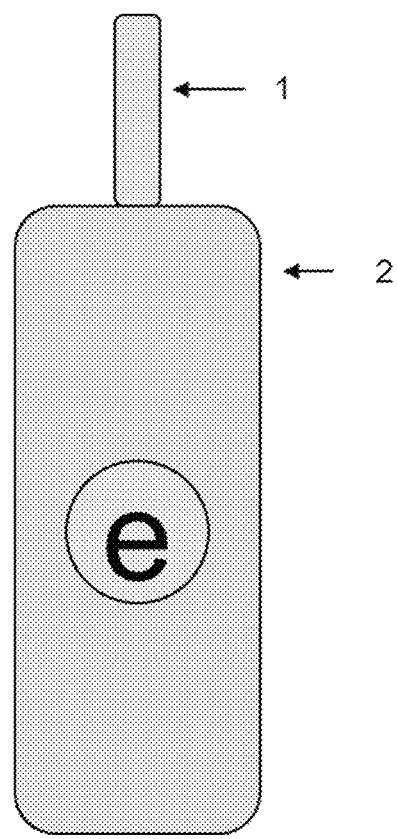
FIG. 2 is a schematic showing an embodiment of a sensor unit 1 connected to a gateway 2 according to the present disclosure, where the sensor unit has the shape of a jackstick, which is inserted to be mechanically and electrically connected to the gateway.

FIG. 1 (to the right) shows an embodiment of a gateway 2, and FIG. 2 shows an embodiment of a sensor unit 1 connected to a gateway 2. In this embodiment, the sensor unit has the shape of a jackstick, which is detachably attached to the gateway by inserting the jackstick, such that it is mechanically and electrically connected to the gateway.

A sensor unit may also be referred to as a sensor plug, and a gateway may be referred to as a datalogger. For a sensor configured for measuring temperature, the connected kit of sensor unit and gateway may be referred to as a datalogger or more specifically a thermometer.

Advantageously, the sensor is configured for measuring one or more environmental parameters, which may be subjected to regulatory control.

In an embodiment of the disclosure, the environmental parameter is selected from the group of: temperature, pressure, pH, humidity, $CO_2$, $O_2$, acceleration, sound, light, GPS, particulate matter, and combinations thereof.

The electronic dimensioning of the sensor unit further depends on the frequency of measurements. Advantageously, the frequency of measurements are set to facilitate sufficient control, simultaneously with minimizing the electronic dimensions.

In an embodiment of the disclosure, the sensor unit is configured for carrying out a parameter measurement at least once per day or once per hour, more preferably at least once per 30, 20, or 10 minutes, and most preferably at least once per 3, 2, or 1 minutes.

In the present disclosure, the measured parameter data are stored on the gateway, and optionally further transmitted to a remote unit. The remote unit may be a cloud-based server, or to minimize the risk of external access to the data, the remote unit may be an off-line server. Depending on the electronic dimensions of the gateway, and the data security requirements, the gateway may transmit the data to the remote unit either continuously or periodically, and the gateway transmitting means may include wire transmission, wireless transmission, and/or internet transmission.

In an embodiment of the disclosure, the gateway is configured for further transmitting the electronic information to a remote unit, such as an off-line server or a cloud-based server. In a further embodiment, the gateway transmitting means are selected from the group of: wire transmission, wireless transmission, and internet transmission. In a further embodiment, the gateway is configured for further transmitting the electronic information at least once per 24 hours, more preferably at least once per 18, 12, 8 hours, such as once per hour, or immediately when a measurement is carried out.

The data transmitted to the remote unit may include unique sensor identity, the validated calibration status, and the measured parameter data. It may be further advantageous that the data of the remote unit can be accessed by a third party, for example in the form of a web accessible interface. Thus, the third party will have real-time access to the data, and can monitor and surveil the environment, without having direct access to the sensor unit and gateway.

In an embodiment of the disclosure, the remote unit comprises an accessible interface, such as a web accessible interface.

To ensure that the raw data are securely transmitted, the electronic information transmitted from the sensor unit is preferably encrypted.

In an embodiment of the disclosure, the sensor unit is configured for encryption or hash securing the measured and optionally stored parameter(s).

The calibration status may require that the measured parameter raw data are corrected. The precision of the correction will depend on how the correction is approximated to the established calibration relationship. Sufficient precision was seen to obtainable by using a polynomial correction value.

In an embodiment of the disclosure, the sensor unit is configured for correcting the measured and optionally stored parameter(s) based on the validated calibration status. In a further embodiment, the correction is a polynomial correction value, such as an n'th polynomium, where n is the degree of the polynomial, and preferably n is between 2-5, and more preferably n is 2.

Sensor Unit Components

The sensor unit according to the present disclosure advantageously comprises one or more electronic components in addition to the sensor itself. The dimensioning of the sensor unit therefore depends on the number of electronic components, as well as their capacity and sizes.

Figure 7:
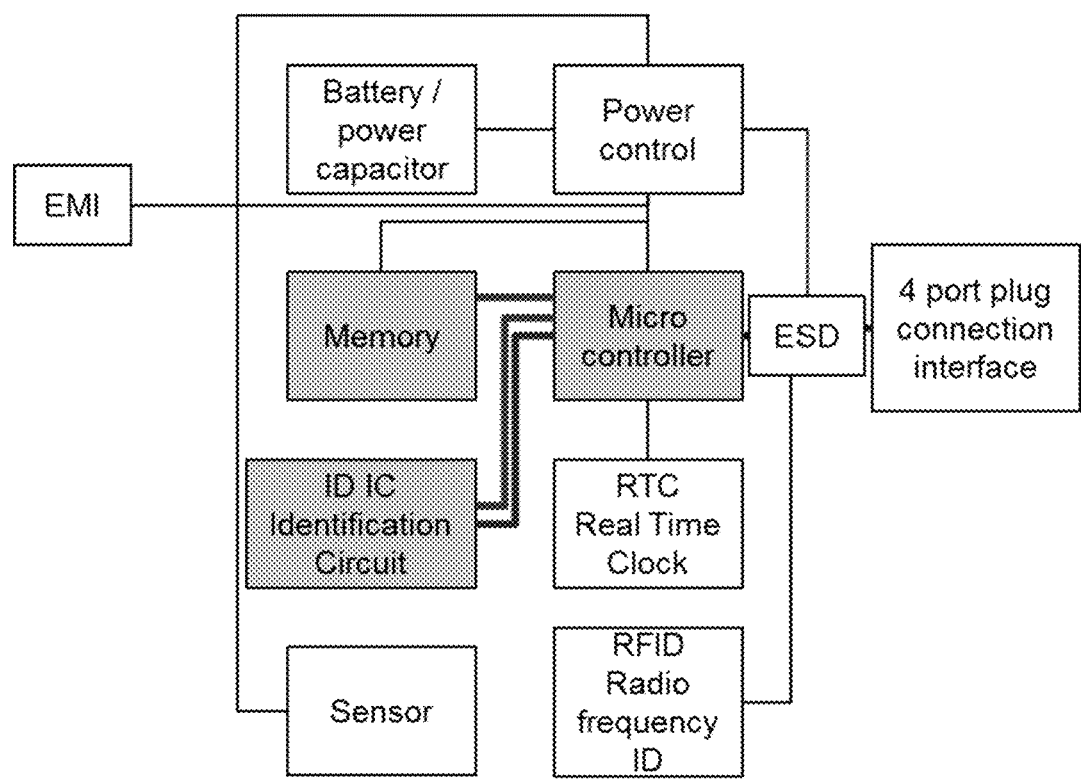
FIG. 7 is a schematic showing an embodiment of a sensor unit comprising multiple electronic components.

FIG. 7 shows an embodiment of a sensor unit comprising multiple electronic components. Advantageously, the sensor unit comprises a memory unit configured for storing the electronic information, and further advantageously, the memory unit is dimensioned for storing the measured parameters, the corrected parameters, the validated calibration status, including the user retrievable calibration certificate in compliance to ISO17025 or NIST version of same, the correction values, and information related to the encryption or hash secured, or HASH'ed data.

In an embodiment of the disclosure, the sensor unit comprises a memory unit for storing the electronic information, such as the measured parameters, the corrected parameters, the validated calibration status and/or the user retrievable calibration certificate, the correction values, and information related to the encryption or hash securing.

To improve the data security and reliability, the sensor unit advantageously comprises an identification circuit (ID IC) as a hardware encoded identification. To minimize the number of components and simplify the system, the ID IC may further be configured for tracing the electronic information stored on the memory unit, and the ID IC may be a circuit or a software.

In an embodiment of the disclosure, the sensor unit comprises an identification circuit (ID IC) as a hardware encoded identification. In a further embodiment, the ID IC is further configured for tracing or tagging the electronic information stored on the memory unit. In a further embodiment, the ID IC is a circuit or a software.

The sensor unit further advantageously comprises a microcontroller dimensioned for processing electronic data, such as receiving the measured parameters, correcting the measured parameters, and saving the measured and/or corrected parameters on the memory unit.

In an embodiment of the disclosure, the sensor unit comprises a microcontroller for processing the electronic data, such as receiving the measured parameters, correcting the measured parameters, and saving the measured and/or corrected parameters on the memory unit.

The sensor unit does not require a power source to be operated. When the sensor unit is connected to a gateway, the gateway provides the power needed for collecting, storing, processing, and transmitting the data. Thus, the sensor unit may consist of entirely disposable and non-harmful or toxic parts.

In an embodiment of the disclosure, the sensor unit is configured to be disposable.

In a further embodiment of the disclosure, the gateway comprises a power unit, such as a battery.

By including a power source, such as a battery and optionally a power control, the sensor unit may be operated without a gateway. Thus, the sensor would keep on measuring during power failures, connection failures or other hardware related issues, and it facilitates that the unit is used as a standalone device. FIG. 7 shows an embodiment of a sensor unit comprising a battery and a power control.

In an embodiment of the disclosure, the sensor unit comprises a power unit, such as a battery.

Further advantageously, the sensor unit comprises one or more of the additional components illustrated in FIG. 7. For example the sensor unit may comprise an EMI for protection for electromagnetic interference, and/or a RTC for real Time Clock for keeping measurements tagged with valid timestamp, and/or RFID for radio Frequency Identification as a means of communication with gateway, and/or ESD for Electro Static Discharge as protection against incoming discharges, and/or 4 port plug for connection with gateway Sensor Unit Calibration The present disclosure provides a simpler and more efficient method of calibrating a sensor unit. The combination of a sensor unit with smaller electronic dimensions, which are detachable from the gateway, facilitates simultaneous calibration of a multiple of sensor units, such as a multiple of temperature sensor units. Certified and reliable calibration of an individual temperature sensor may be carried out at a specified time interval, e.g. 4-24 hours, and typically a certified temperature calibration has a duration of ca. 12 hours. However, by simultaneously calibrating multiple sensor units, the effective calibration time is reduced.

Figure 6:
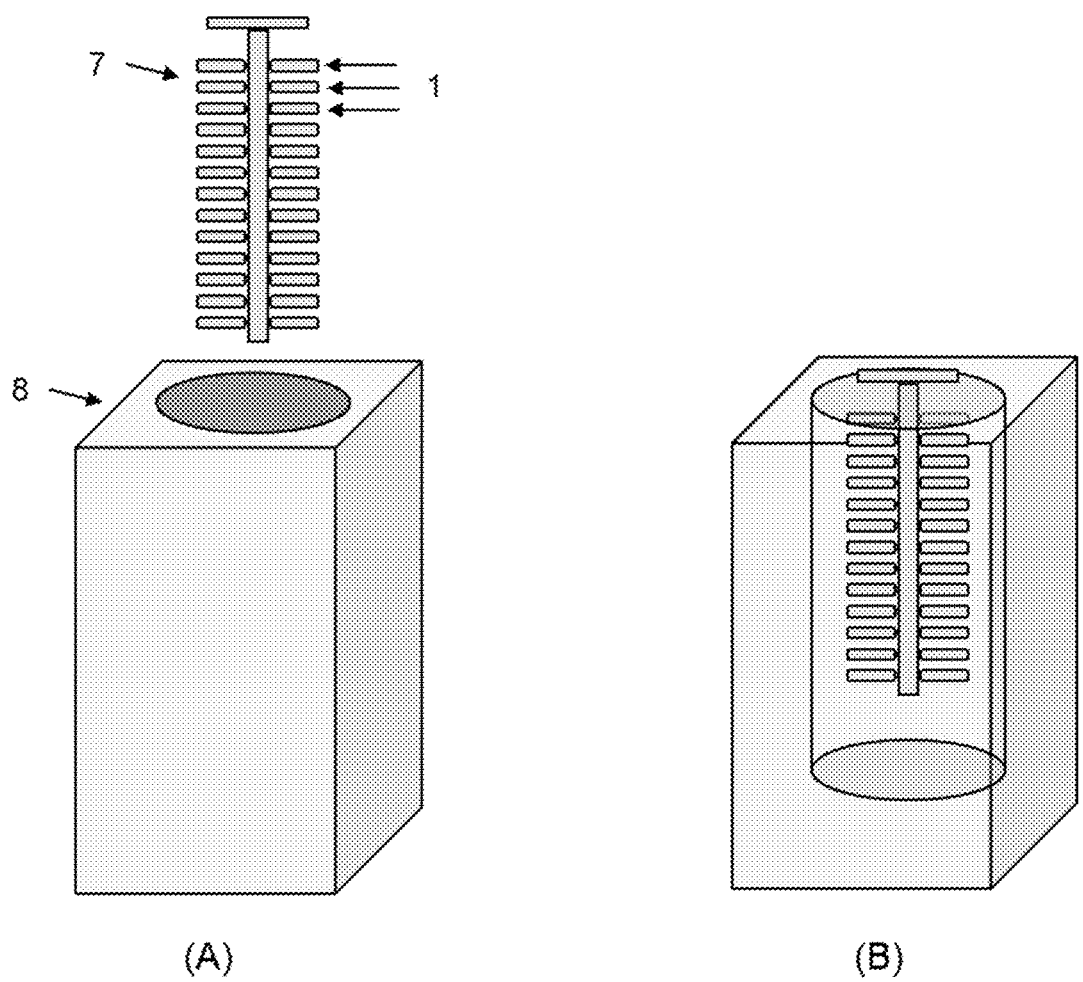
FIGS. 6A and 6B are schematics showing an embodiment of a calibration process for a multiple of sensor units, where (A) the multiple sensor units 1 are placed on a rack 7, and (B) subsequently immersed in a calibration liquid 8.

FIG. 6 shows an embodiment of a calibration process for a multiple of sensor units, where (A) the multiple sensor units 1 are placed on a rack 7, and (B) subsequently immersed in a calibration liquid 8. The sensor units are placed on a rack 7, which is electrically connected to an external source, e.g. by a multiplexer, such that the electronic information associated with the calibration, such as the calibration values and the validation, are stored on each of the sensor units.

For simplicity of the process, it is advantageous that the rack of sensor units may be immersed into a liquid without any further sealing. This may be obtained if the sensor units are configured to be waterproof, and the sensor units are configured to form an electrically connection to the rack, where the connection is waterproof or at least water-resistant, and/or by using non-conducting calibration mediums, such as mineral oil or purified water.

In an embodiment of the disclosure, the sensor unit is configured to be waterproof or water-resistant.

In another embodiment, the sensor unit is configured to be calibrated in a non-conducting calibration medium.

To improve the reliability of the sensor measurements, it may be advantageous to repeat the calibration after a certain or predetermined period of using the sensor unit. This way, the reliability of the sensor measurements carried out are retrospectively verified, and the sensor unit may subsequently be re-used or disposed of.

Advantageously, the predetermined period is below ca. 5 years, such as ca. 4 or 3 years, or preferably is ca. 1 year.

Gateway Connection

As described previously, the sensor unit is mechanically and electrically detachably attached to the gateway. For easy attachment and detachment, the mechanical connection is advantageously formed by a simple thread, twist lock, snap fit, clip-on, magnetic and slide lock. The electrical connection may be formed by the mechanical established physical contact, and in addition by other means such as magnet, NFC, and energy harvesting.

In an embodiment of the disclosure, the mechanical detachably attachment is obtained by means selected from the group of: thread, twist lock, snap fit, clip-on, magnetic and slide lock. In a further embodiment, the electrical detachably attachment is obtained by means selected from the group of: magnet, NFC, physical contact, and energy harvesting.

As an example, FIG. 2 shows an embodiment where the sensor unit has the shape of a plug, or a jack stick, and mechanical and electrical contact is established simultaneously by inserting the plug into the gateway. Alternatively, the sensor unit may be embodied as a strip, card or label, which may be slided, or clipped-on, the gateway to form a mechanical and electrical connection, in the same manner as a sim-card.

In an embodiment of the disclosure, the sensor unit is shaped as a plug, jack stick, strip, card or label.

It is essential that the connection between the sensor unit and gateway is mechanical and electrically stable. To ensure that this is the case, the sensor unit and/or the gateway advantageously comprises an indicator unit, configured to indicate the attachment status. The indicator unit may be a visible alert and/or a sound alert, such as a light as illustrated in FIG. 3C, where the sensor unit comprises an indicator unit 5 alerting by light and/or sound. In addition, or alternatively, the first indicator unit may be in the form of an alert or warning as electronic information, such as by sms, email, and/or app.

In an embodiment of the disclosure, the sensor unit comprises a first indicator unit configured to indicate the attachment status between the sensor unit and gateway, wherein the first indicator unit preferably is visible.

Surveillance System

The present disclosure provides an environmental surveillance system, where the maintenance requirements, as well as the operational efficiency are improved.

FIG. 4D shows an embodiment of an environment, exemplified as a fridge, to be monitored. The connected sensor unit and gateway are placed in the environment, and the uniquely identifiable measurements, and associated calibration status, is transmitted wirelessly to a remote unit 6.

For the purpose of surveillance, an alert or warning is activated if the sensor unit and/or gateway detects a deviation in the measured parameter from a predetermined threshold value. Optionally, the predetermined threshold value may be changeable, such as variable over time. The alert or warning may be local and visible, such as blinking lights or a sound, or in the form of electronic information, such as an alert by sms, email, phone call and/or app.

In an embodiment of the disclosure, a second indicator unit configured to be activated when the measured parameters deviate from a predetermined threshold value. In a further embodiment, the second indicator unit is visible or an electronic information.

After a predetermined time of operation, the calibration of the sensor unit will no longer be validated. A validated calibration is defined with an expiration date. Thus, when the calibration is no longer validated, or the sensor unit becomes broken or unstable, the sensor unit must be recalibrated or replaced.

For the system of the present disclosure, the gateway is advantageously configured for replacing a first sensor unit with a second sensor unit. Thus, the gateway remains fixed in the environment, and the second sensor unit may immediately replace the first sensor unit. Following the replacement, the uniquely identifiable measurements, and associated calibration status, of the second sensor unit is fully traceable transmitted. Thus, the present disclosure provides a surveillance system, with essentially no operational downtime and no need for back-up systems.

In an embodiment of the disclosure, the gateway is configured for replaceable sensor units.

Figure 5:
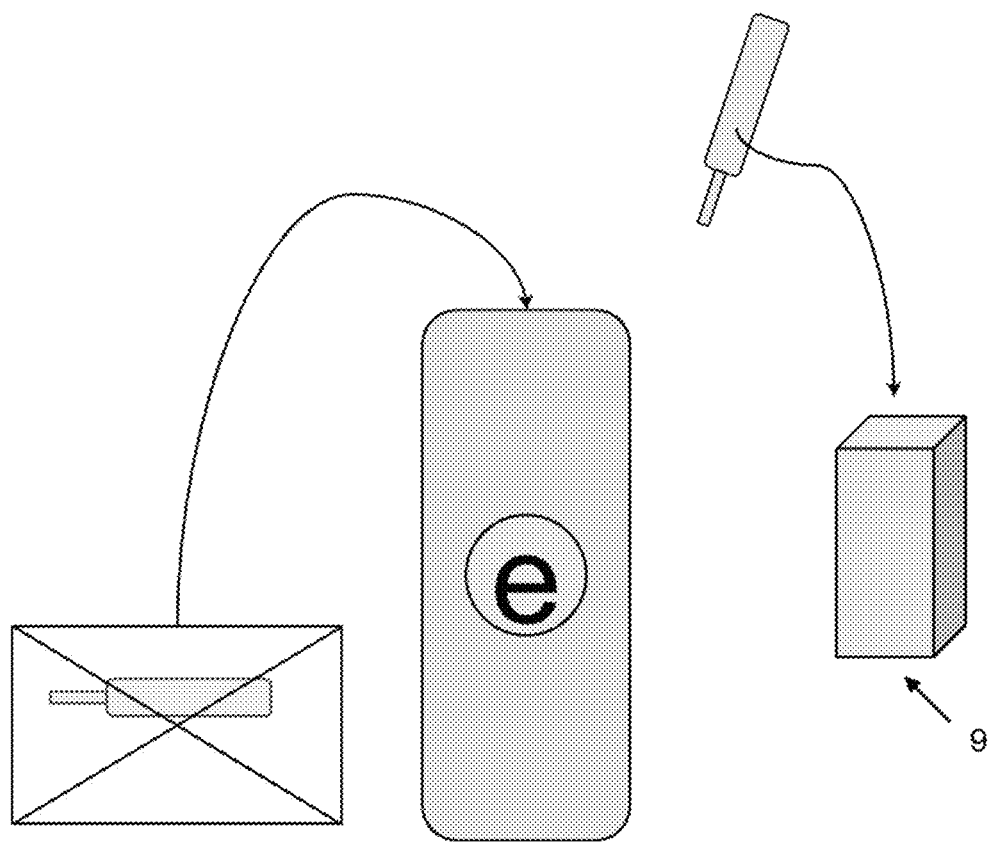
FIG. 5 is a schematic showing an embodiment of replacing the first sensor unit, where the first sensor unit is disposed in the waste 9, and the second sensor unit is obtained separately by e.g. mail; The process may be repeated any number of times.

FIG. 5 shows an embodiment of replacing the first sensor unit, where the first sensor unit is disposed in the waste 9, and the second sensor unit is obtained separately by e.g. mail. The process may be repeated any number of times.

Figure 4:
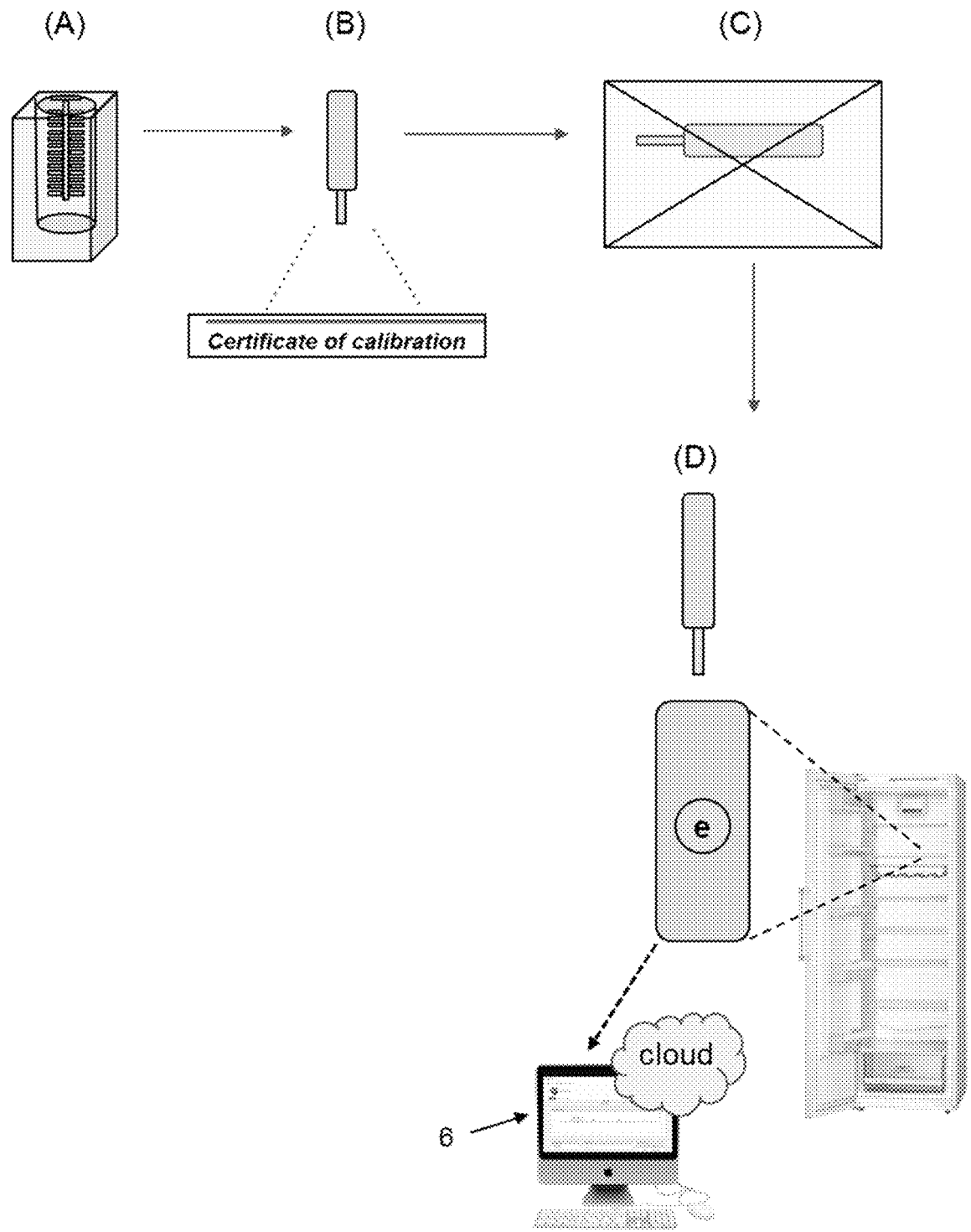
FIGS. 4A-D are schematics showing an embodiment of the life cycle of a sensor unit: (A) the sensor unit is first calibrated, and (B) the information associated with the calibration status is stored onto the sensor unit, (C) the sensor unit is then transferred to the gateway placed at the place of use, where (D) the sensor unit is inserted into the gateway.

A gateway may have the sensor unit replaced any number of times. FIG. 4 shows an embodiment of the life cycle of a sensor unit: (A) the sensor unit is first calibrated, and (B) the information associated with the calibration status is stored onto the sensor unit, (C) the sensor unit is then transferred to the gateway placed at the place of use, where (D) the sensor unit is inserted into the gateway. When the sensor unit becomes inoperable it is immediately replaced by a new, as illustrated in FIG. 5. The inoperable sensor unit may either be discarded as shown in FIG. 5, or recalibrated as illustrated in FIG. 4A.

Thus, the gateway may have the sensor unit replaced with another validated and traceable calibrated sensor unit any number of times. A new sensor unit may be obtained by mail as e.g. illustrated in FIGS. 4A-C. The replacement may take place immediately and without interruption in the environmental surveillance system, and thus with essentially no downtime and no need for back-up systems.

REFERENCE NUMBERS

1—Sensor unit
2—Gateway
3—Electronic information

4—Visible unique identity
5—Indicator unit
6—Remote unit
7—Rack
8—Calibration liquid
9—Waste
10—Memory
11—ID IC
12—Sensor unit
13—Microcontroller Items The presently disclosed may be described in further detail with reference to the following items.

1. A sensor unit connectable to a gateway, and configured for measuring at least one environmental parameter, and configured to be calibratable relative to said environmental parameter(s), and further configured for storing electronic information associated with a validated calibration status and a unique identity of the sensor unit.
2. The unit according to item 1, wherein the validated calibration status is a calibration certificate.
3. The unit according to item 2, wherein the validated calibration status is validated according to ISO 17025, or accredited to ISO 17025, and/or accredited by the corresponding NIST and/or ILAC.
4. The unit according to items 2-3, wherein the validated calibration status is in the format of a directly conformable certificate, such as a directly retrievable pdf format.
5. The unit according to any of the preceding items, wherein the validated calibration status is a validated traceable calibration status.
6. The unit according to any of the preceding items, wherein the sensor unit is configured for storing electronic information associated with the validated calibration status and the calibration history.
7. The unit according to any of the preceding items, wherein the unique identity of the sensor unit is a hardware encoded identification for machines, such as a silicon serial number.
8. The unit according to any of the preceding items, further comprising one or more unique identity of the sensor unit visible for human interaction, such as a name, bar code, and/or GS1 datamatrix, such as a GS1 GRAI code.
9. The unit according to any of the preceding items, further configured for carrying out a parameter measurement at least once per day or once per hour, more preferably at least once per 30, 20, or 10 minutes, and most preferably at least once per 3, 2, or 1 minutes.
10. The unit according to any of the preceding items, wherein the environmental parameter is selected from the group of: temperature, pressure, pH, humidity, $CO_2$, $O_2$, acceleration, sound, light, GPS, particulate matter, and combinations thereof.
11. The unit according to any of the preceding items, further configured for storing electronic information associated with the measured parameter(s).
12. The unit according to any of the preceding items, further configured for encryption or hash securing the measured and optionally stored parameter(s).
13. The unit according to any of the preceding items, further configured for correcting the measured and optionally stored parameter(s) based on the validated calibration status.
14. The unit according to item 13, wherein the correction is a polynomial correction value, such as an n'th polynomium, where n is the degree of the polynomial, and preferably n is between 2-5, and more preferably n is 2.
15. The unit according to any of the preceding items, comprising a memory unit for storing the electronic information, such as the measured parameters, the corrected parameters, the validated calibration status and/or the user retrievable calibration certificate, the correction values, and information related to the encryption or hash securing.
16. The unit according to any of the preceding items, further comprising a microcontroller for processing the electronic data, such as receiving the measured parameters, correcting the measured parameters, and saving the measured and/or corrected parameters on the memory unit.
17. The unit according to any of the preceding items, comprising an identification circuit (ID IC) as a hardware encoded identification.
18. The unit according to items 17, wherein the ID IC is further configured for tracing or tagging the electronic information stored on the memory unit.
19. The unit according to items 17-18, wherein the ID IC is a circuit or a software.
20. The unit according to any of the preceding items, wherein the sensor unit is configured to be disposable.
21. The unit according to any of the preceding items, further comprising a power unit, such as a battery.
22. The unit according to any of the proceeding items, wherein the gateway is configured for receiving, storing, and optionally further transmitting the electronic information of the sensor unit.
23. The unit according to item 22, wherein the gateway is configured for further transmitting the electronic information to a remote unit, such as an off-line server or a cloud-based server.
24. The unit according to item 23, wherein the remote unit comprises an accessible interface, such as a web accessible interface.
25. The system according to items 23-24, wherein the gateway transmitting means are selected from the group of: wire transmission, wireless transmission, and internet transmission.
26. The unit according to items 23-25, wherein the gateway is configured for further transmitting the electronic information at least once per 24 hours, more preferably at least once per 18, 12, 8 hours, such as once per hour, or immediately when a measurement is carried out.
27. The unit according to any of the preceding items, wherein the gateway further comprises a power unit, such as a battery.
28. The unit according to any of the preceding items, wherein the gateway is configured for replaceable sensor units.
29. The unit according to any of the preceding items, wherein the sensor unit is mechanically and electrically detachably attached to the gateway.
30. The unit according to item 29, wherein the mechanical detachably attachment is obtained by means selected from the group of: thread, twist lock, snap fit, clip-on, magnetic and slide lock.
31. The unit according to items 29-30, wherein the electrical detachably attachment is obtained by means selected from the group of: magnet, NFC, physical contact, and energy harvesting.
32. The unit according to any of the preceding items, wherein the sensor unit is shaped as a plug, jack stick, strip, card or label.
33. The unit according to any of the preceding items, further comprising a first indicator unit configured to indicate the attachment status between the sensor unit and gateway, wherein the first indicator unit preferably is visible.
34. The unit according to any of the preceding items, further comprising a second indicator unit configured to be activated when the measured parameters deviate from a predetermined threshold value.
35. The unit according to item 34, wherein the second indicator unit is visible or an electronic information.
36. The unit according to any of the preceding items, further configured to be waterproof or water-resistant.
37. A gateway system for monitoring an environment with respect to at least one environmental parameter, the system comprising:
at least one calibratable sensor unit configured for measuring at least one environmental parameter, said sensor unit having a unique identity and a validated calibration status associated with electronic information stored thereon,
at least one power unit connectable with the sensor unit(s) and configured for receiving, storing, and optionally further transmitting, information pertaining to the unique identity, the validated calibration status, and said environmental parameter(s) from said sensor unit.
38. The system according to item 37, comprising the sensor unit according to any of items 1-36.
39. An environmental surveillance system comprising a plurality of networked gateway systems according to items 37-38, wherein each of the gateway systems are configured to transmit information pertaining to the unique identity, the validated calibration status, and environmental parameter(s) from each sensor unit connected to said gateway system, and wherein the environmental surveillance system is configured to receive said information via said network, process said information in order to detect an outlier and store the unique identity, the calibration state and said environmental parameter(s) from each sensor unit.
40. A method for calibrating multiple temperature sensor units in a liquid, comprising the steps of:
providing multiple temperature sensor units, such as at least 50 sensor units, wherein each sensor unit is configured for measuring temperature,
mounting the multiple temperature sensor units on a rack,
arranging the rack with the temperature sensor units in a liquid,
performing a calibration routine such that each temperature sensor units is calibrated relative to the temperature of the liquid,
optionally storing a calibration state on each temperature sensor unit and associating each temperature sensor unit with a unique identity.
41. The method according to item 40, for the sensor unit according to items 1-36.

REFERENCES

[1] WO 2016/162545
[2] US 2014/0200840

The invention claimed is:
1. A sensor unit connectable to a gateway, and configured for measuring at least one environmental parameter, and configured to be calibratable relative to said environmental parameter(s), and further configured for storing:
electronic information associated with a validated calibration status of the sensor unit,
a sensor measurement measured by the sensor unit,
one or more associated calibration values of a calibration associated with the sensor measurement, wherein the sensor measurement is traceable to the calibration values via the use of a known reference, thereby obtaining traceability between the sensor measurement and the calibration values, and wherein the sensor unit at least partially simultaneously stores the sensor measurement and the one or more associated calibration values of the calibration associated with the sensor measurement, and
a unique identity of the sensor unit,
wherein the validated calibration status of the sensor unit comprises a calibration certificate, the calibration certificate being an electronic document,
wherein the electronic document comprises verifiable authenticity and authorship information; and
wherein the at least one environmental parameter is configured to be transmitted from the sensor unit along with the electronic information associated with the validated calibration status comprising the electronic document and the unique identity of the sensor unit, thereby securing that the calibration status specific to the uniquely identified sensor unit is tagged to the sensor measurement.
2. The unit according to claim 1, wherein the validated calibration status further comprises an encrypted fingerprint stored on the sensor, the fingerprint enabling a secure validation of the calibration certificate.
3. The unit according to claim 2, wherein the fingerprint is obtained by a hashing function.
4. The unit according to claim 1, wherein the validated calibration status further comprises a validated traceable calibration status.
5. The unit according to claim 1, wherein the unique identity of the sensor unit is a hardware encoded identification for machines.
6. The unit according to claim 5, wherein the hardware encoded identification for machines is a silicon serial number.
7. The unit according to claim 1, further configured for storing electronic information associated with the measured parameter(s).
8. The unit according to claim 1, comprising an identification circuit (ID IC) as a hardware encoded identification.
9. The unit according to claim 8, wherein the ID IC is configured for tracing or tagging the electronic information stored on the memory unit.
10. The unit according to claim 1, wherein the sensor unit is configured to be disposable.
11. The unit according to claim 1, wherein the gateway is configured for receiving and storing the electronic information of the sensor unit.
12. The unit according to claim 1, wherein the gateway is configured for replaceable sensor units.
13. The unit according to claim 1, further comprising a first indicator unit configured to indicate an attachment status between the sensor unit and gateway.
14. The unit according to claim 13, wherein the first indicator unit is visible.

15. The unit according to claim 1, further comprising a second indicator unit configured to be activated when the measured parameters deviate from a predetermined threshold value.

16. The unit according to claim 15, wherein the second indicator unit is visible or an electronic information.

17. A method for calibrating multiple temperature sensor units, comprising the steps of:
providing multiple temperature sensor units each according to claim 1,
mounting the multiple temperature sensor units on a rack,
arranging the rack with the temperature sensor units in a liquid, and
performing a calibration routine such that each temperature sensor units is calibrated relative to the temperature of the liquid and storing a calibration state on each temperature sensor unit and associating each temperature sensor unit with a unique identity.

18. The method according to claim 17, further comprising the step of storing a calibration state on each temperature sensor unit and associating each temperature sensor unit with a unique identity.

19. The unit according to claim 1, configured for encryption or hash securing the measured and stored parameter(s).

20. The unit according to claim 1, wherein the gateway is configured for receiving, storing, and transmitting the electronic information of the sensor unit.

21. The unit according to claim 1, wherein the at least one environmental parameter is temperature and/or humidity.

22. The unit according to claim 1, wherein the sensor unit is configured for being directly mechanically and/or electrically detachably attached to the gateway.

23. The unit according to claim 1, wherein the verifiable authenticity information further comprises an indication of alteration or non-alteration of the calibration certificate since a production of the calibration certificate from a calibration laboratory.

24. A gateway system for monitoring an environment with respect to at least one environmental parameter, the system comprising:
at least one calibratable sensor unit configured for measuring at least one environmental parameter, said sensor unit having a unique identity and a validated calibration status associated with electronic information stored thereon,
wherein the sensor unit comprises raw measurement data measured by the sensor unit and associated calibration values of a calibration for each measurement data, wherein the measurement data is traceable to the calibration values via the use of a known reference, thereby obtaining traceability between the raw measurement data and the calibration values,
wherein the validated calibration status of the sensor unit comprises a calibration certificate, the calibration certificate being an electronic document,
wherein the electronic document comprises verifiable authenticity and authorship information,
at least one power unit connectable with the sensor unit(s) and configured for receiving, storing, and transmitting information pertaining to the unique identity, the validated calibration status, and said environmental parameter(s) from said sensor unit; and
wherein the at least one environmental parameter is configured to be transmitted from the sensor unit along with the electronic information associated with the validated calibration status comprising the electronic document and the unique identity of the sensor unit, thereby securing that the calibration status specific to the uniquely identified sensor unit is tagged to the measurement data.

25. An environmental surveillance system comprising a plurality of networked gateway systems according to claim 13, wherein each of the gateway systems are configured to transmit information pertaining to the unique identity, the validated calibration status, and environmental parameter(s) from each sensor unit connected to said gateway system, and wherein the environmental surveillance system is configured to receive said information via said network, process said information in order to detect an outlier and store the unique identity, the calibration state and said environmental parameter(s) from each sensor unit.

26. A method of using a sensor unit connectable to a gateway, and configured for measuring at least one environmental parameter, and configured to be calibratable relative to said environmental parameter(s), the method comprising steps of:
storing electronic information associated with a validated calibration status of the sensor unit on the sensor unit,
storing a sensor measurement measured by the sensor unit on the sensor unit,
storing one or more associated calibration values of a calibration associated with the sensor measurement for obtaining traceability between the sensor measurement and the calibration values, wherein the sensor measurement and the one or more associated calibration values of the calibration associated with the sensor measurement are stored at least partially simultaneously on the sensor unit, and
storing a unique identity of the sensor unit on the sensor unit,
wherein the validated calibration status of the sensor unit comprises a calibration certificate, the calibration certificate being an electronic document,
wherein the electronic document comprises verifiable authenticity and authorship information; and
wherein the at least one environmental parameter is configured to be transmitted from the sensor unit along with the electronic information associated with the validated calibration status comprising the electronic document and the unique identity of the sensor unit, thereby securing that the calibration status specific to the uniquely identified sensor unit is tagged to the sensor measurement.

* * * * *